(12) United States Patent
Adamec et al.

(10) Patent No.: US 7,649,441 B2
(45) Date of Patent: *Jan. 19, 2010

(54) METHOD AND SYSTEM FOR TUNING AN RFID INTERROGATOR

(75) Inventors: Andrew J. Adamec, Buford, GA (US); John F. Crooks, Duluth, GA (US)

(73) Assignee: NCR Corporation, Dayton, OH (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/557,544

(22) Filed: Nov. 8, 2006

(65) Prior Publication Data

US 2008/0106381 A1      May 8, 2008

(51) Int. Cl.
*H04Q 5/22* (2006.01)
(52) U.S. Cl. .................. 340/10.2; 370/465; 375/224; 455/67.13
(58) Field of Classification Search ............... 340/10.1, 340/10.2, 572.1; 370/464, 465; 375/224; 455/67.13
See application file for complete search history.

(56) References Cited

U.S. PATENT DOCUMENTS

| 6,130,894 A | 10/2000 | Ojard et al. |
| 2004/0179547 A1* | 9/2004 | Kuffner et al. ............... 370/465 |
| 2004/0179588 A1 | 9/2004 | Kuffner et al. |

FOREIGN PATENT DOCUMENTS

WO    WO 2007/023472    3/2007

OTHER PUBLICATIONS

EPCglobal Inc., EPC™ Radio-Frequency Identity Protocols Class-1 Generation-2 UHF RFID Protocol for Communications at 860 MHz—960 MHz, Ver. 1.0.9, Jan. 31, 2005.

* cited by examiner

*Primary Examiner*—Thomas J Mullen
(74) *Attorney, Agent, or Firm*—Harden E. Stevens, III (57) ABSTRACT

A method, apparatus, and system for periodically measuring the level of ambient noise found on a radio frequency channel used by a radio frequency identification interrogator to read radio frequency identification tags. The ambient noise is measured after the radio frequency identification interrogator has transmitted a signal. The measured level of ambient noise is then used to dynamically adjust a threshold value used to predict collisions on the channel.

25 Claims, 4 Drawing Sheets

FIG. 4

METHOD AND SYSTEM FOR TUNING AN RFID INTERROGATOR

TECHNICAL FIELD

An embodiment of the present invention relates generally to Radio Frequency Identification.

BACKGROUND

Radio Frequency Identification (RFID) systems are employed to identify and thus track a wide array of objects. Some examples of objects that use RFID technology for identification and tracking are documents (i.e., passports and drivers license), retail merchandise, portable electronics, furniture, parts, pharmaceuticals, and shipping containers. The RFID systems comprise one or more RFID interrogators that read information stored in RFID tags and a computer for processing the information. The RFID tag is normally attached directly to an object or is placed inside packaging that contains the object. Whenever an RFID tag is within range of an RFID interrogator, the RFID interrogator reads the information encoded on the RFID tag.

SUMMARY OF THE INVENTION

Ambient or background noise, which includes RF signals from other tags, interrogators, and devices, can make it difficult or in some cases impossible for an RFID interrogator to detect an RF reply signal from an RFID tag. To mitigate this problem, protocol parameters have been established. The protocol parameters control the transmission of an RF reply signal by an RFID tag. The values for the different protocol parameters are determined by the RFID interrogator and transmitted to the RFID tags, which then use the parameters to generate and transmit RF reply signals. Properly set, the protocol parameters will increase the probability that an RFID interrogator will accurately read all RFID tags within range even in the presence of ambient noise. If the protocol parameters are not properly set, the RFID interrogator will fail to read some or all of the RFID tags within the range of the RFID interrogator. Therefore, it is desirable for the RFID interrogator to be able to determine proper values for the protocol parameters to be able to read all RFID tags within range.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
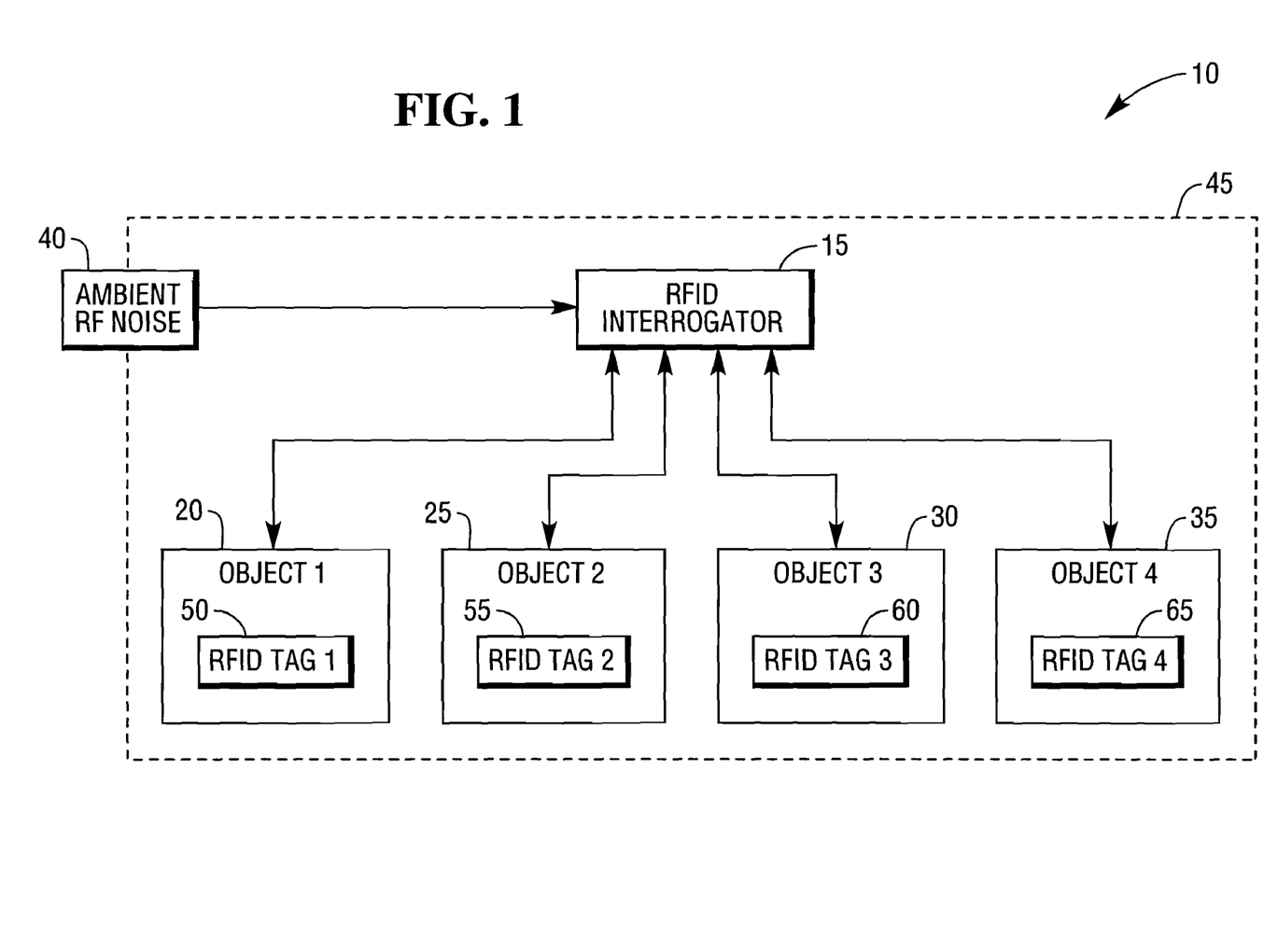
FIG. 1 is an illustration of an example RFID system comprising an RFID Interrogator and a plurality of RFID tags.

As shown in FIG. 1, an exemplary illustration of an RFID system 10 comprises an RFID interrogator 15 (also referred to as an RFID tag reader or RFID reader), ambient noise 40, and multiple objects 20, 25, 30, 35 each containing an RFID tag 50, 55, 60, 65. Each of the RFID tags contains information that identifies the RFID tag and by association the object. The information stored on each RFID tag may uniquely identify each RFID tag from all other RFID tags or the information may identify an RFID tag as belonging to a certain group (e.g., a one-gallon container of milk). In some embodiments, RFID tags contain additional information beyond what is necessary to uniquely identify a tag or to identify a group. For example, the RFID tag may contain information identifying a unique one-gallon container of milk from all other containers of milk plus have additional information specifying the supplier, lot number, and expiration date of the milk.

Continuing with FIG. 1, the RFID interrogator 15 is designed to read the information from each RFID tag 50, 55, 60, 65 that is within the RFID interrogator's 15 range 45. The RFID interrogator 15 reads information stored on an RFID tag by transmitting a radio frequency (RF) signal. This signal is referred to as a query signal or query command. The query signal is received by all RFID tags 50, 55, 60, 65 that are in range 45 of the RFID interrogator 15. The RFID tags then transmit an RF reply signal that includes the information stored in the RFID tag. The RFID interrogator 15 receives the RF reply signals from each RFID tag and recovers the information contained in each RF reply signal. The information may contain almost any type of data including a globally unique ID number, a price, tracking data, a destination, a part number, a serial number, or other attributes or combination of attributes that describe the object associated with the tag. Some RFID systems support RFID tags that contain relatively small amounts of information while other systems support RFID tags that contain large amounts of data and some support both types of tags.

To reduce cost, some types of RFID tags do not have an internal source of power, i.e., a battery, to drive the electronics of the tag. These types of tags are referred to as passive tags. A passive tag comprises an antenna connected to electronics, which usually consist of a single integrated circuit (IC). Passive tags are powered by the minute electrical current induced in the tag's antenna by an incoming RF signal transmitted by an RFID interrogator. The induced current provides a source of electrical energy that is sufficient to power up the IC and to transmit a reply signal back to the RFID interrogator. Passive RFID tags generate a RF reply signal using a backscattering technique where the RF signal from the interrogator is modulated and reflected back to the RFID interrogator. Information stored in each tag is included in the RF reply signal. This transmission method reduces the power needed to operate a tag thus eliminating the need for a battery and reducing the cost of the tag. However, the RF signal transmitted by a passive tag is very weak.

In the presence of ambient RF noise 40, the RFID interrogator may fail to distinguish between RF reply signals from tags and the ambient RF noise 40. When this occurs, the RFID interrogator 15 will fail to read one or more RFID tags. Additionally, the level of ambient RF noise 40 will vary over time and can cause intermittent failures and reliability issues. Most RFID environments have a detectable level of ambient RF noise 40 which can interfere with communications between the RFID interrogator 15 and the RFID tags. The source or sources of the ambient RF noise 40 will vary and may physically reside inside or outside the range 45 of the RFID interrogator 15. In some environments, one or more powered transmitters, i.e., cell phones, cordless phones, WiFi systems (IEEE 802.11), or even other interrogators, contribute to the level of ambient RF noise. Ambient RF noise from these sources is relatively easy to identify and in some cases the system can be adapted to co-exist with these sources. However, in some environments, there exist one or more sources of the ambient RF noise where the ambient RF noise of interest is not detectable until after the interrogator transmits an RF signal. In some cases, the noise source is one or more non-transient RFID tags placed too close to the interrogator, which causes the tags to repeatedly respond to the interrogator. Protocol parameters can usually deal with the non-transient RFID tags by turning them off or otherwise preventing their participating in the process of querying transient RFID tags. In other cases, the source or sources are electro-mechanical devices that reflect or backscatter the interrogator's RF signal. Most of these devices were not specifically designed to transmit RF signals but nevertheless their design and mode of operation make it possible for them to reflect or backscatter an RF signal. In the absence of an RF signal to backscatter, these devices radiate little RF noise in the frequency band used by the RFID system. However, when the interrogator transmits an RF signal, these devices will reflect or backscatter the RF signal thus creating a source of ambient RF noise. Fans and florescent light ballasts are examples of electro-mechanical devices that display the characteristic of backscattering an RF signal.

Figure 2:
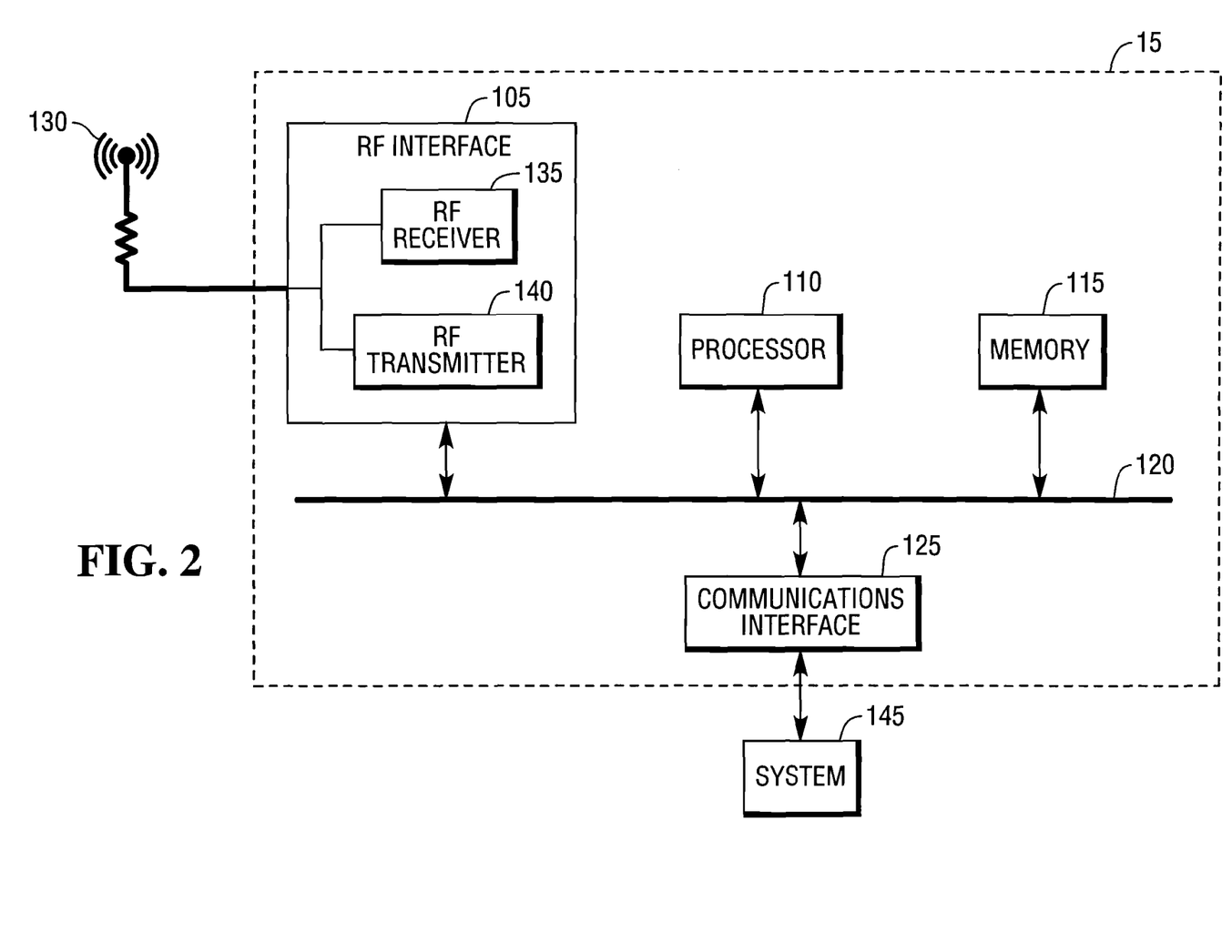
FIG. 2 is high-level functional diagram of an example RFID Interrogator.

Now referring to FIG. 2, the interrogator 15 is comprised of a processor 110 connected over a bus 120 to: a memory 115, a communications interface 125, and an RF interface 105. The memory 115 contains both volatile and non-volatile types of memory. The non-volatile memory is used to store instructions that when executed by the processor 110, control the operation of the RFID interrogator 15. The non-volatile memory also contains parameters that are used by the instructions to control the RFID interrogator 15. In some embodiments, the processor 110 has the ability to change the contents of the non-volatile memory. In some embodiments, the processor 110 accesses the memory over a dedicated memory bus. The processor 110 uses the communications interface 125 to communicate with one or more external systems 145. The communications interface may be comprised of a wired interface such as Ethernet or a wireless interface such as Wi-Fi (IEEE 802.11). In some embodiments, one of the external systems is a point-of-sale terminal used in a retail environment. In some embodiments, one of the external systems includes a database that is used with information from the RFID tags to identify and track objects.

Continuing with FIG. 2, the processor 110 uses the RF Interface 105 to communicate with one or more RFID tags. The RF interface 105 comprises an RF transmitter 140 and an RF receiver 135, both supporting multiple RF channels used to communicate with RFID tags. The RF transmitter 140 and the RF receiver 135 are connected to antenna 130 and use the antenna 130 to transmit and receive signals to and from RFID tags. In some embodiments, multiple antennae are used to increase the range and ability to communicate with the RFID tags. Because a signal from a passive RFID tag is so weak, objects placed between the RFID tag and the antenna 130 act to shield and prevent the weak RF reply signal from reaching the antenna 130. An RFID system with more than one antenna increases the probability that the RF reply signal from an RFID tag will be received by at least one of the system's antennae. The additional antennae thus increase the range 45 and reliability of the RFID interrogator 15.

The RFID interrogator 15 is limited to receiving only one RF reply signal, per RF channel, at a time. In a multi-tag environment where multiple RFID tags are in range 45 of the RFID interrogator 15 at any given time, a collision occurs if more than one RFID tag replies at the same time. When a collision occurs, all data is lost because the signals are unintelligible. To prevent collisions, the RFID interrogator 15 must singulate each RFID tag within the RFID interrogator's 15 range 45. Singulating an RFID tag occurs when the RFID interrogator 15 is able to identify and communicate with only one RFID tag at a time. The singulating process involves the RFID interrogator 15 setting and passing protocol parameters to all RFID tags within range 45. The RFID tags then use the parameters to determine the appropriate time and channel to use when communicating with the interrogator 15. If the parameters are properly set, the interrogator 15 will successfully singulate all RFID tags within range 45. If the parameters are not properly set, collisions will occur between RFID tags and singulation will take longer or may not occur at all.

EPCglobal Inc™ is an international organization that has established voluntary standards that govern certain aspects of an RFID system. One standard from this organization is the "EPC™ Radio-Frequency Identity Protocols Class-1 Generation-2 UHF RFID Protocol for Communications at 860 MHz-960 MHz, Version 1.0.9," which is herein incorporated by reference, includes guidelines for the operation of the RFID interrogator and tags. An interrogator that meets the requirements of this standard is described as a class 1, generation 2 interrogator. RFID interrogator 15 complies with the standard for a class 1, generation 2 interrogator although in other embodiments, RFID interrogator 15 will comply with other RFID standards that work with passive and/or active RFID tags.

The EPCglobal Inc™ standard for a class 1, generation 2 RFID system defines a set of protocol parameters that govern the performance and accuracy of an RFID interrogator as it singulates RFID tags in an RFID system. The protocol parameters include: 1) "Q" which sets the number of slots in the round; 2) "DR" (TRcal divide ratio) sets the T→R link frequency; 3) "SEL" chooses which Tags respond to the Query signal or command; 4) "SESSION" chooses a session for the inventory round; and 5) "TARGET" selects whether tags whose inventoried flag is A or B participate in the inventory round. The purpose of the protocol parameters is to eliminate multiple simultaneous tag responses (i.e., collisions) to a query signal from the RFID interrogator 15. The protocol parameters are broadcast to all tags within range of the interrogator 15 during the query process.

The "Q" configurable protocol parameter identifies the number of time slots available for the tags to reply to a query signal. Each tag requires one time slot to reply to a query signal from the interrogator 15. In a case where Q is set to 1, all tags within range of the interrogator will transmit their reply to a query signal in the same time slot. If multiple tags are in range of the interrogator, the tags will all transmit their reply in the same time slot and cause a collision. To prevent any possibility of a collision, Q could be set to the maximum value of 32,768 ($2^{15}$). This would prevent collisions but throughput performance of the RFID system would suffer greatly because it could take up to 32,768 time slots to singulate a tag. It is therefore desirable to use a smaller value for "Q" when the tag population is small and a larger "Q" value when the tag population is large to maximize throughput while reducing or eliminating collisions.

As shown above, when the protocol parameters are not properly set, a collision will occur when the interrogator 15 fails to successfully singulate all the RFID tags causing more than one tag to respond at the same time, on the same RF channel. The EPCglobal Inc™ standard does not provide an intrinsic feature that will detect a collision; therefore the interrogator 15 does not directly sense a collision or the presence of multiple tags during a collision. Additionally, a collision can be mistaken for a situation where there are no tags within range 45 of the interrogator 15 when the query signal is transmitted, so the interrogator 15 will have no reply signals to detect. Thus, an interrogator that implements the class 1, generation 2 standard can not intrinsically distinguish between a collision that signifies the presence of multiple tags and the absence of a response that signifies no tags are present.

Architects of the standard sought to address the problems of system performance and distinguishing between no tags and multiple tags by suggesting that the interrogator use a default setting for the protocol parameters that force a predetermined minimum number of time slots. The presumption being that the minimum number of time slots will be large enough to allow some successful singulations to occur in a multi-tag environment but small enough so as not to adversely affect system performance. An algorithm is outlined in which a feedback loop is used to increase or decrease the number of time slots based upon the number of successful singulations. The algorithm states: 1) decrease the number of time slots (but not below the minimum number) if the number of successful singulations is equal to zero; 2) keep the number of time slots the same, if the number of successful singulations is equal to one; and 3) increase the number of time slots, if the number of successful singulations is greater than one. This algorithm would be continuously applied while the RFID system is operating.

In addition to using the number of successful singulations to adjust the number of time slots, the architects of the standard sought to predict the occurrence of a collision between tags. While the interrogator 15 cannot intrinsically detect a collision between two or more tags, the interrogator can compare the magnitude of a received signal to a threshold value and then predict whether a collision has occurred. The architects also defined a statistically calculated static threshold value for each RF channel used by the interrogator 15. (The threshold value is sometimes referred to as a decision threshold.) Using this method, if a received signal exceeds the threshold value, a collision is assumed to have occurred. To prevent another collision, the number of time slots is increased. If the received signal falls below the threshold value, it is assumed that no collision has occurred. To improve system throughput performance, the number of time slots is decreased when there are no collisions but not below the minimum number.

This scheme is prone to errors because the statistically defined static threshold values cannot adapt to the dynamic nature of the ambient RF noise in an RFID environment. The level of ambient RF noise 40 varies over time and by geographical location. To address this issue, the statistically defined static values are set relatively high. In environments that have periods of low ambient RF noise 40, the threshold values are too high causing the interrogator 15 to miss a weak response from a tag at the edge of the interrogator's 15 range 45. In this case, the interrogator 15 falsely sees the weak response as noise. In environments that have periods of high ambient RF noise 40, the threshold values are too low causing the interrogator 15 to falsely identify ambient RF noise 40 as collisions. The false collisions will cause the RFID system to increase the number of time slots as it attempts to reduce the number of collisions. This causes intermittent problems that are difficult and expensive to diagnose. In environments that have a constant high level of ambient RF noise 40, the increase in collisions will adversely affect the performance of the RFID system and the interrogator's ability to read tags.

Figure 3:
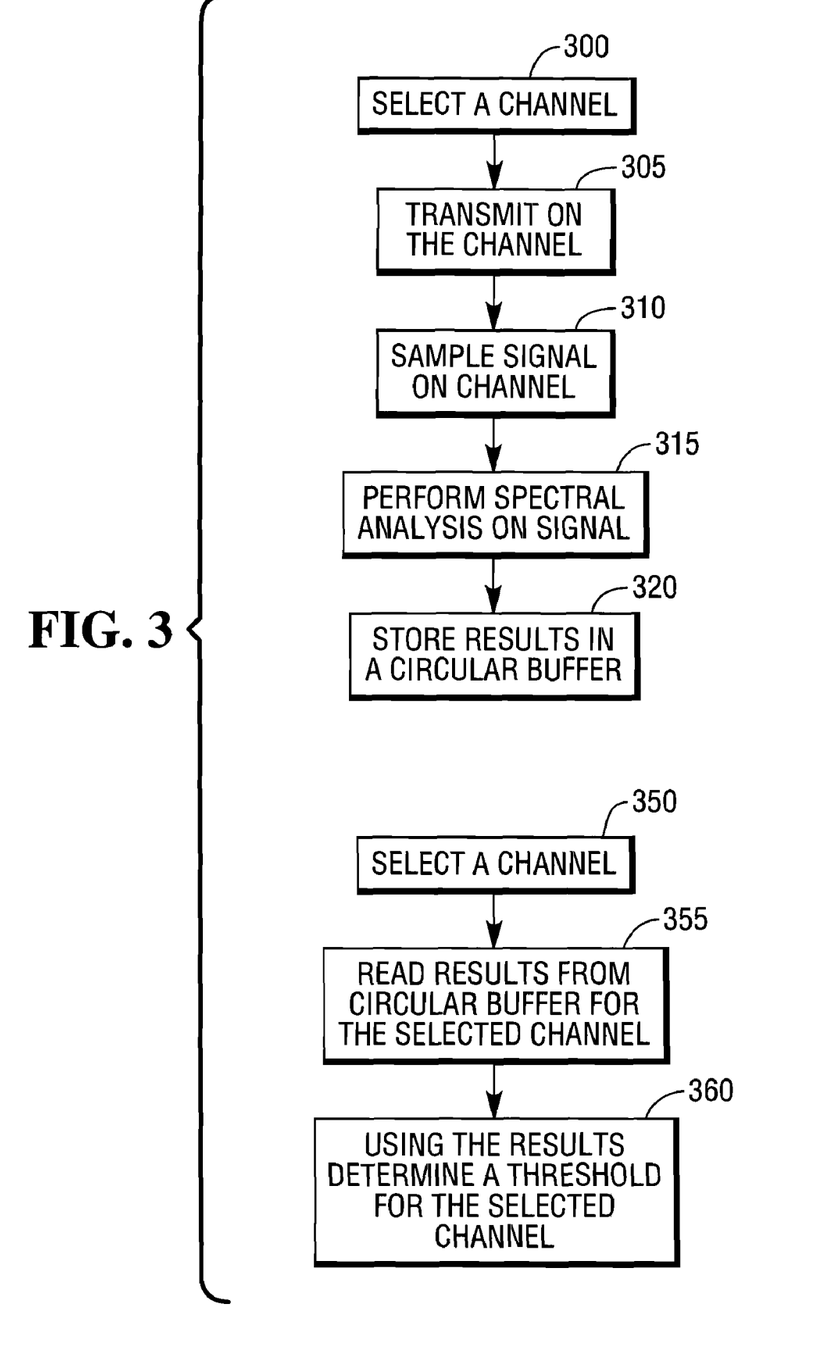
FIG. 3 is high-level flow diagram illustrating an example method for determining the threshold value for an RF channel.

Referring now to FIG. 3, there is provided a block diagram that illustrates a method for dynamically adjusting the interrogator's 15 threshold values used to predict collisions. The interrogator 15 communicates with the RFID tags on a number of different radio frequencies or RF channels and a threshold value is maintained for each RF channel. In step 300, the interrogator 15 selects one of the RF channels supported by the RF receiver 135. In some embodiments, it is also possible to adjust the bandwidth of the RF receiver 135. In which case, the bandwidth is narrowed to increase the sensitivity of the RF receiver 135. In step 305, the interrogator 15 causes the RF transmitter 140 to transmit a brief signal. The brief signal will not cause RF tags to respond but will cause devices that are prone to reflect or backscatter an RF signal to do so. In step 310, the interrogator 15 causes the RF receiver 135 to capture a sample of the signal being received on the selected RF channel. This signal represents the instantaneous ambient RF noise for the selected RF channel. The interrogator 15 then performs a spectral analysis on the sampled signal 315. This is accomplished in the frequency domain using Fourier analysis. However, other methods can be used to perform the same analysis. The spectral analysis produces a result that is the magnitude of the instantaneous ambient RF noise signal for the selected RF channel. In step 320, the interrogator 15 stores the result in a circular buffer that is dedicated to storing results for the selected RF channel. During idle periods, the interrogator 15 continuously repeats this process for each RF channel. At some point, the circular buffers for each RF channel become full. At which time, the oldest result is removed and the newest result is added. The size of the circular buffer is selectable.

Concurrent with determining the magnitude of the instantaneous ambient RF noise for each RF channel, the interrogator 15 calculates a dynamic threshold value for each channel by using the results stored in the circular buffer assigned to the RF channel. This is illustrated as follows. In step 350, the interrogator 15 selects a single RF channel. In step 355, the interrogator 15 reads all of the results from the circular buffer assigned to the selected RF channel. The ambient RF noise for the channel is modeled using a statistical Gaussian distribution, which has well known formulas to calculate the mean, variance, and standard deviation. Assuming the ambient noise will continue to follow a Gaussian distribution model, the interrogator 15 sets the threshold value for the selected channel to the mean of the results from the circular buffer plus three standard deviations 360. During idle periods, the interrogator 15 periodically repeats this process for each channel. In this way, the threshold value for each channel is periodically updated and based on a statistical analysis of actual real-time ambient RF noise found on each RF channel.

Figure 4:
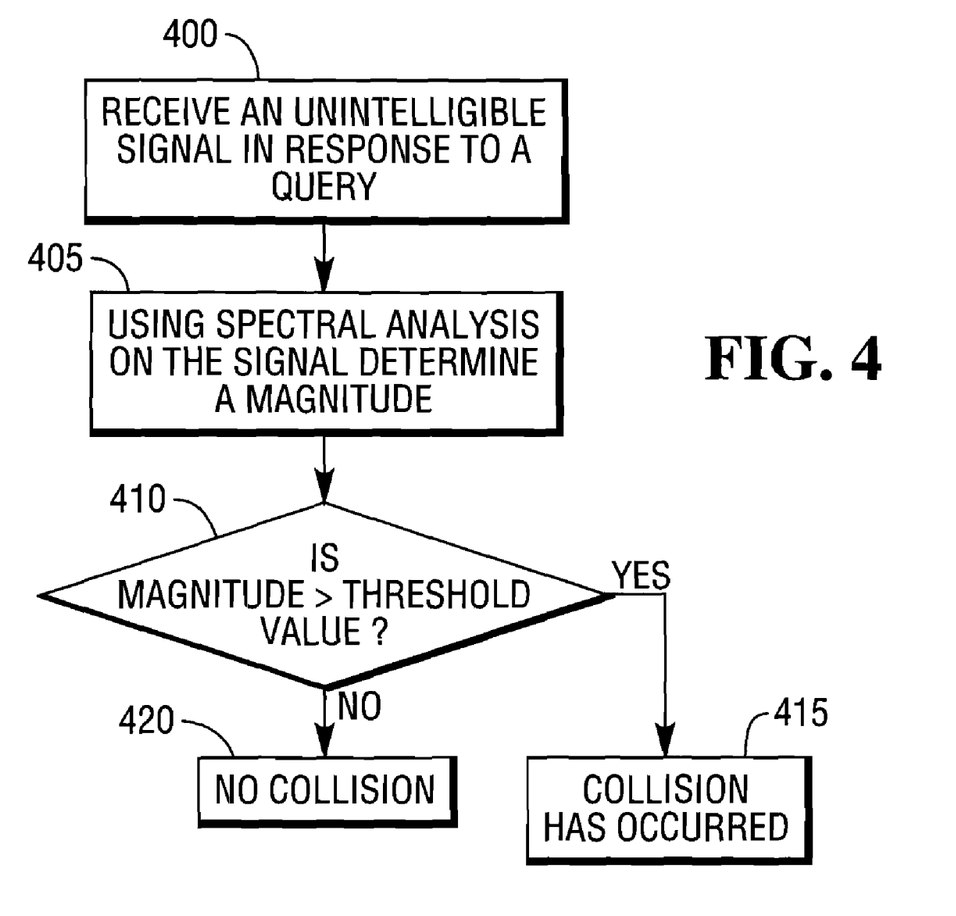
FIG. 4 is high-level flow diagram illustrating an example method for determining that a collision has occurred.

Now referring to FIG. 4, using a modified version of the above method for determining the instantaneous ambient RF noise on an RF channel and the threshold value for a RF channel, the interrogator 15 can predict whether a collision has occurred. The method begins when the interrogator 15 receives a signal in response to a query signal but the received signal is unintelligible (step 400). The interrogator 15 performs the spectral analysis on the received signal and determines a magnitude for the received signal (step 405). The magnitude is then compared to the threshold value for the RF channel used to receive the signal (step 410). The interrogator 15 concludes that a collision has occurred when the magnitude of the signal is greater than the threshold value (step 415). When the magnitude of the signal is less than the threshold, the interrogator 15 concludes that no collision has occurred and that there are no tags are within range (step 420).

When a collision is predicted to have occurred, the interrogator 15 adjusts the protocol parameters to increase the number of time slots in an effort to eliminate future collisions. The interrogator 15 then issues another query signal and checks the replies. This process is repeated until there are no collisions and all tags are read. Predicting collisions using dynamic threshold values is more accurate and dependable than using statistically defined static threshold values. Therefore, the use of conservative protocol parameters, that force a minimum number of time slots that adversely affects system throughput, is no longer required. The conservative protocol parameters were an additional safeguard that is only required when the interrogator 15 is using statistically defined static threshold values. Therefore, using dynamic threshold values increases prediction accuracy and allows the interrogator 15 to initially set the protocol parameters to as few as one time slot to maximize system throughput while still effectively handling collisions.

There are many sources of the instantaneous ambient RF noise and they will vary from one environment to another. The source or sources can be: other interrogators, a communication system operating nearby (i.e., WiFi or cellular), spurious emissions from electronic equipment, a device that reflects or backscatters RF signals, or a combination of sources. Whatever the source, the use of dynamic threshold values by the interrogator 15 will allow the RFID system to dynamically adapt to the current environment so as to maintain maximum throughput and reliability.

It should also be appreciated that an RFID system using active RFID tags (tags that use batteries to power the electronics and RF transmitter) or a combination of active and passive RFID tags will have the same benefits as the above RFID system.

While the present invention is disclosed in the context of a presently preferred embodiment, it will be recognized that a wide variety of implementations may be employed by persons of ordinary skill in the art consistent with the above discussion, the drawings, and the claims that follow below.

What is claimed is:

1. A method for use in optimizing a radio frequency identification interrogator, the method comprising:
    transmitting a radio frequency signal on a radio frequency channel which will not cause radio frequency identification tags to respond but will cause other items within range of the radio frequency identification interrogator and prone to reflect or backscatter to do so;
    receiving a radio frequency signal within the radio frequency channel;
    performing spectral analysis on the received signal to obtain a result which is a measure of condition of the radio frequency channel; and
    setting a decision threshold for the interrogator based on a statistical analysis that uses the result.

2. The method of claim 1, wherein the received signal comprises a measure of ambient noise on the radio frequency channel.

3. The method of claim 1, wherein the result produced by the spectral analysis is the magnitude of the received signal.

4. The method of claim 1, wherein the spectral analysis comprises a Fourier analysis of the received signal.

5. The method of claim 1, wherein the result is stored in a circular buffer assigned to the radio frequency channel.

6. The method of claim 5, wherein the statistical analysis includes using a Gaussian distribution model on data stored in the circular buffer.

7. The method of claim 6, wherein the decision threshold is set to the mean plus three standard deviations.

8. The method of claim 7, wherein the decision threshold is associated with the radio frequency channel.

9. A radio frequency identification interrogator comprising:
    a radio frequency transmitter adapted to transmit radio frequency signals on one or more radio frequency channels;
    a radio frequency receiver adapted to receive radio frequency signals on one or more radio frequency channels;
    a processing unit in communication with the receiver and transmitter; and
    a memory device electrically coupled to the processing unit, wherein the memory device has stored therein a plurality of instructions which, when executed by the processing unit, cause the processing unit to:
        (i) select a radio frequency channel;
        (ii) cause the transmitter to transmit a radio frequency signal on the selected radio frequency channel which will not cause radio frequency identification tags to respond, but will cause other items within range of the transmitter prone to reflect or backscatter to do so;
        (iii) receive from the receiver a signal on the radio frequency channel;
        (iv) perform a spectral analysis on the received signal to obtain a result which is a measure of condition of the radio frequency channel; and
        (v) set a decision threshold for the interrogator based on a statistical analysis that uses the result.

10. The interrogator of claim 9, wherein the received signal comprises a measure of ambient noise on the radio frequency channel.

11. The interrogator of claim 9, wherein the result produced by the spectral analysis is the magnitude of the received signal.

12. The interrogator of claim 9, wherein the spectral analysis comprises a Fourier analysis of the received signal.

13. The interrogator of claim 9, wherein the bandwidth of the receiver is narrowed prior to causing the transmitter to transmit the signal.

14. The interrogator of claim 9, wherein the result is stored in a circular buffer assigned to the radio frequency channel.

15. The interrogator of claim 14, wherein the statistical analysis includes using a Gaussian distribution model on data stored in the circular buffer.

16. The interrogator of claim 15, wherein the decision threshold is set to the mean plus three standard deviations.

17. The interrogator of claim 16, wherein the decision threshold is associated with the radio frequency channel.

18. A radio frequency identification system, the system comprising:
    a computer;
    a radio frequency identification interrogator in communication with the computer, the interrogator comprising:
        a transmitter adapted to transmit radio frequency signals on one or more radio frequency channels;
        a receiver adapted to receive radio frequency signals on one or more radio frequency channels;
        a processing unit in communication with the transmitter and receiver; and
        a memory device electrically coupled to the processing unit, wherein the memory device has stored therein a plurality of instructions which, when executed by the processing unit, cause the processing unit to:
            (i) cause the transmitter to transmit a radio frequency signal on a radio frequency channel which will not cause radio frequency identification tags to respond, but will cause other items within range of the transmitter prone to reflect or backscatter to do so;
(ii) receive a signal on the radio frequency channel from the receiver;
(iii) perform a spectral analysis on the received signal to obtain a result which is a measure of channel condition; and
(iv) set a decision threshold for the interrogator based on a statistical analysis that uses the result.

19. The interrogator of claim 18, wherein the received signal comprises a measure of ambient noise on the radio frequency channel.

20. The interrogator of claim 18, wherein the result produced by the spectral analysis is the magnitude of the received signal.

21. The interrogator of claim 18, wherein the spectral analysis comprises a Fourier analysis of the received signal.

22. The interrogator of claim 18, wherein the result is stored in a circular buffer assigned to the radio frequency channel.

23. The interrogator of claim 22, wherein the statistical analysis includes using a Gaussian distribution model on data stored in the circular buffer.

24. The interrogator of claim 23, wherein the decision threshold is set to the mean plus three standard deviations.

25. The interrogator of claim 24, wherein the decision threshold is associated with the radio frequency channel.

* * * * *

UNITED STATES PATENT AND TRADEMARK OFFICE
CERTIFICATE OF CORRECTION

PATENT NO. : 7,649,441 B2
APPLICATION NO. : 11/557544
DATED : January 19, 2010
INVENTOR(S) : Adamec et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 455 days.

Signed and Sealed this

Twenty-eighth Day of December, 2010

David J. Kappos
*Director of the United States Patent and Trademark Office*